(12) United States Patent
Lu et al.

(10) Patent No.: US 7,966,289 B2
(45) Date of Patent: Jun. 21, 2011

(54) SYSTEMS AND METHODS FOR READING OBJECTS IN A FILE SYSTEM

(75) Inventors: Qichu Lu, Bellevue, WA (US); Aaron J. Passey, Seattle, WA (US); Nicholas Montgomery Kirsch, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 576 days.

(21) Appl. No.: 11/894,697

(22) Filed: Aug. 21, 2007

(65) Prior Publication Data

US 2009/0055399 A1    Feb. 26, 2009

(51) Int. Cl.
*G06F 17/30* (2006.01)

(52) U.S. Cl. ....................................................... 707/640

(58) Field of Classification Search ........................ None
See application file for complete search history.

(56) References Cited

U.S. PATENT DOCUMENTS

| | | | |
|---|---|---|---|
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,459,871 A | 10/1995 | Van Den Berg |
| 5,481,699 A | 1/1996 | Saether |
| 5,548,724 A | 8/1996 | Akizawa et al. |
| 5,548,795 A | 8/1996 | Au |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |

(Continued)

FOREIGN PATENT DOCUMENTS

EP    0774723    5/1997

(Continued)

OTHER PUBLICATIONS

Nov. 15, 2002 Int'l Search report PCT/US02/24728, 2 pages.

(Continued)

*Primary Examiner* — Neveen Abel-Jalil
*Assistant Examiner* — Kevin Young
(74) *Attorney, Agent, or Firm* — Knobbe, Martens, Olson & Bear, LLP

(57) ABSTRACT

Embodiments of the disclosure relate generally to file systems. Specifically, certain embodiments include systems and methods for reading objects in a file system. In some embodiments, a first processing thread traverses a portion of a file system and represents file system objects in a data structure. A portion of the data and/or metadata associated with the represented objects may be prefetched to a memory. In some embodiments, a second processing thread consumes the objects represented in the queue. For example, in a file system backup embodiment, the second processing thread may transfer data and/or metadata associated with the objects to an archive target.

13 Claims, 6 Drawing Sheets

U.S. PATENT DOCUMENTS

| | | |
|---|---|---|
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,966,707 A | 10/1999 | Van Huben et al. |
| 5,996,089 A | 11/1999 | Mann |
| 6,000,007 A | 12/1999 | Leung et al. |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,055,564 A | 4/2000 | Phaal |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A * | 9/2000 | Litwin et al. ................. 714/4 |
| 6,138,126 A | 10/2000 | Hitz et al. |
| 6,154,854 A | 11/2000 | Stallmo |
| 6,173,374 B1 | 1/2001 | Heil et al. |
| 6,202,085 B1 | 3/2001 | Benson et al. |
| 6,209,059 B1 | 3/2001 | Ofer et al. |
| 6,219,693 B1 | 4/2001 | Napolitano et al. |
| 6,279,007 B1 | 8/2001 | Uppala |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,415,259 B1 | 7/2002 | Wolfinger et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,496,842 B1 | 12/2002 | Lyness |
| 6,499,091 B1 | 12/2002 | Bergsten |
| 6,502,172 B2 | 12/2002 | Chang |
| 6,502,174 B1 | 12/2002 | Beardsley |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,631,411 B1 | 10/2003 | Welter et al. |
| 6,658,554 B1 | 12/2003 | Moshovos et al. |
| 6,662,184 B1 | 12/2003 | Friedberg |
| 6,671,686 B2 | 12/2003 | Pardon et al. |
| 6,671,704 B1 | 12/2003 | Sripada et al. |
| 6,687,805 B1 | 2/2004 | Cochran |
| 6,725,392 B1 | 4/2004 | Frey et al. |
| 6,732,125 B1 | 5/2004 | Autrey et al. |
| 6,742,020 B1 | 5/2004 | Dimitroff et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,871,295 B2 | 3/2005 | Ulrich et al. |
| 6,895,482 B1 | 5/2005 | Blackmon et al. |
| 6,895,534 B2 | 5/2005 | Wong et al. |
| 6,907,011 B1 | 6/2005 | Miller et al. |
| 6,907,520 B2 | 6/2005 | Parady |
| 6,917,942 B1 | 7/2005 | Burns et al. |
| 6,920,494 B2 | 7/2005 | Heitman et al. |
| 6,922,696 B1 | 7/2005 | Lincoln et al. |
| 6,922,708 B1 | 7/2005 | Sedlar |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,017,003 B2 | 3/2006 | Murotani et al. |
| 7,043,485 B2 | 5/2006 | Manley et al. |
| 7,043,567 B2 | 5/2006 | Trantham |
| 7,069,320 B1 | 6/2006 | Chang et al. |
| 7,103,597 B2 | 9/2006 | McGoveran |
| 7,111,305 B2 | 9/2006 | Solter et al. |
| 7,113,938 B2 | 9/2006 | Highleyman et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,181,746 B2 | 2/2007 | Perycz et al. |
| 7,184,421 B1 | 2/2007 | Liu et al. |
| 7,194,487 B1 | 3/2007 | Kekre et al. |
| 7,206,805 B1 | 4/2007 | McLaughlin, Jr. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,290,056 B1 | 10/2007 | McLaughlin, Jr. |
| 7,313,614 B2 | 12/2007 | Considine et al. |
| 7,318,134 B1 | 1/2008 | Oliveira et al. |
| 7,346,346 B2 | 3/2008 | Lipsit |
| 7,346,720 B2 | 3/2008 | Fachan |
| 7,373,426 B2 | 5/2008 | Jinmei et al. |
| 7,386,675 B2 | 6/2008 | Fachan |
| 7,386,697 B1 | 6/2008 | Case et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,509,524 B2 | 3/2009 | Patel et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,551,572 B2 | 6/2009 | Passey et al. |
| 7,558,910 B2 | 7/2009 | Alverson et al. |
| 7,571,348 B2 | 8/2009 | Deguchi et al. |
| 7,577,258 B2 | 8/2009 | Wiseman et al. |
| 7,577,667 B2 | 8/2009 | Hinshaw et al. |
| 7,590,652 B2 | 9/2009 | Passey et al. |
| 7,593,938 B2 | 9/2009 | Lemar et al. |
| 7,596,713 B2 * | 9/2009 | Mani-Meitav et al. ........... 714/6 |
| 7,631,066 B1 | 12/2009 | Schatz et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,689,597 B1 | 3/2010 | Bingham et al. |

| | | |
|---|---|---|
| 7,716,262 B2 | 5/2010 | Pallapotu |
| 7,739,288 B2 | 6/2010 | Lemar et al. |
| 7,743,033 B2 | 6/2010 | Patel et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,822,932 B2 | 10/2010 | Fachan et al. |
| 7,840,536 B1 | 11/2010 | Ahal et al. |
| 7,870,345 B2 | 1/2011 | Daud et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0135514 A1 | 7/2003 | Patel et al. |
| 2003/0149750 A1 | 8/2003 | Franzenburg |
| 2003/0158873 A1 | 8/2003 | Sawdon et al. |
| 2003/0161302 A1* | 8/2003 | Zimmermann et al. ...... 370/363 |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182325 A1 | 9/2003 | Manley et al. |
| 2003/0233385 A1 | 12/2003 | Srinivasa et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 | 2/2005 | Lai |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1* | 6/2005 | Jewell ........................ 709/201 |
| 2005/0138195 A1* | 6/2005 | Bono ........................ 709/231 |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0255765 A1 | 11/2007 | Robinson |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |

| | | |
|---|---|---|
| 2008/0154978 A1 | 6/2008 | Lemar et al. |
| 2008/0155191 A1 | 6/2008 | Anderson et al. |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Fachan et al. |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |

FOREIGN PATENT DOCUMENTS

| | | |
|---|---|---|
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.1-2201, 8 pages.
Feb. 22, 2008 Int'l Search report PCT/US07/018326, 20 pages.
May 8, 2008 Int'l Search report PCT/US07/018324, 13 pages.
Philip A. Bernstein, Vassos Hadzilacos, and Nathan Goodman, Concurrency Control and Recovery in Database Systems, Addison-Wesley, 370 pages, 1987.
Kenneth P. Birman, Building Secure and Reliable Network Applications, Manning, 1996, pp. 1-327.
Kenneth P. Birman, Building Secure and Reliable Network Applications, Manning, 1996, pp. 328-619.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.
Jim Gray and Andreas Reuter, Transaction Processing: Concepts and Techniques, Morgan Kaufmann, 1993, pp. 665-1105.
Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.
Nancy A. Lynch, Distributed Algorithms, Morgan Kaufmann, 1996, pp. 1-409.
Nancy A. Lynch, Distributed Algorithms, Morgan Kaufmann, 1996 pp. 410-871.
Sape Mullender, editor, Distributed Systems (2nd Ed.), ACM Press/Addison-Wesley Publishing Co., New York, NY, USA, 1993, pp. 1-327.
Sape Mullender, editor, Distributed Systems (2nd Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., Transactional Information Systems: Theory, Algorithms, and the Practice of Concurrency Control and Recovery, Morgan Kaufmann, 2002, pp. 1-450.
Gerhard Weikum, et al., Transactional Information Systems: Theory, Algorithms, and the Practice of Concurrency Control and Recovery, Morgan Kaufmann, 2002, pp. 451-863.
Sanjay Ghemawat et al., The Google File System, Symposium on Operating Systems Principles, Oct. 19-22, 2003, 15 pages, Bolton Landing, NY.
Pei Cao et al, The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Long, Darrell D.E., et al., *Swift/RAID A Distributed RAID System, Computing Systems*, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat No. 90CH2840-7), pp. 430-437, Feb. 5, 1990.
United States Court of Appeals, Federal Circuit, *Seachange International, Inc.* vs. *nCUBE, Corp.*, Oct. 26, 2004, 28 pages.
United States Court of Appeals, Federal Circuit, *Seachange International, Inc.* vs. *C-Corp, Inc.*, Jun. 29, 2005, 22 pages.
United States District Court, Delaware, *Seachange International, Inc.* vs. *nCUBE, Corp.*, Apr. 7, 2004, 13 pages.
United States District Court, Delaware, *Seachange International, Inc.* vs. *nCUBE, Corp.*, Aug. 29, 2000, 12 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.

MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop On Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Oct. 8, 2008 European Supplemental Search Report EP 02 75 6944, 6 pages.
Jan. 23, 2009 Examination Report EP 02 75 6944, 5 pages.
May 18, 2009 Int'l Search report PCT/US08/059798, 18 pages.
Oct. 22, 2009 Int'l Preliminary Report on Patentability PCT/US08/059798, 10 pages.
Keidar, et al.: Increasing the Resilience of Distributed and Replicated Database Systems (1998) pp. 1-25.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.
Yoshitake Shinkai, Cluster File System: Hamfs, Fujitsu, Japan, Fujitsu Limited, Jul. 9, 1999, vol. 50, No. 4, pp. 210 to 214 (stamped Citation 2 / English Translation attached) total 16 pages.
Duchamp, Dan: "Analysis of Transaction Management Performance", ACM Symposium on Operating Systems Principles, Dec. 1989, pp. 177-190.
Silaghi, Raul et al.: "Porting OMTTs to CORBA", Lecture Notes in Computer Science, vol. 2888/2003, Nov. 2003, pp. 1521-1542.
Dorai et al.:, "Transport Threads: Resource Sharing in SMT Processor for High Single-Thread Performance", proceedings of the 2002 International Conference on Parallel Architectures and Complication Techniques, Sep. 2002, 12 pages.
Peterson, Zachary Nathaniel Joseph, "Data Placement For Copy-On-Write Using Virtual Contiguity," Master of Science in Computer Science Thesis, University of California, Santa Cruz, Sep. 2002, 67 pages.

* cited by examiner

SYSTEMS AND METHODS FOR READING OBJECTS IN A FILE SYSTEM

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

CROSS-REFERENCE TO RELATED APPLICATIONS

This application was filed on the same day as the following applications: U.S. patent application Ser. No. 11/894,756, entitled "SYSTEMS AND METHODS FOR ADAPTIVE COPY ON WRITE," and U.S. patent application Ser. No. 11/894,739, entitled "SYSTEMS AND METHODS FOR PORTALS INTO SNAPSHOT DATA," all of which are hereby incorporated by reference in their entirety herein.

BACKGROUND

1. Field

The systems and methods disclosed herein relate generally to file systems and more specifically to systems and methods for reading objects in a file system.

2. Description of the Related Art

The amount of data stored on digital computing systems has increased dramatically in recent years. Accordingly, users have become increasingly reliant on the storage devices of these computing systems to safely store this data. In order to preserve a copy of the data in case of loss, many users routinely copy some or all of the contents of the storage devices to a backup or archival storage device.

The data stored on the storage devices may be organized as electronic files in a file system. The files may be grouped into directories, with some directories including other directories and/or files. During a backup process, the system typically traverses some or all of the file system to read individual files for transfer to the backup device. However, problems may occur when reading a file system from the storage devices. For example, if the file system includes a large number of relatively small files, the backup system may be latency bound while waiting for each of the individual files to be read from the storage device. Because of the foregoing challenges and limitations, there is a need to provide systems and methods for reading files in a file system.

SUMMARY

In general, embodiments of the invention relate to file systems. More specifically, systems and methods embodying the invention provide support for reading objects such as, for example, files in a file system.

An embodiment of the present invention includes a method of traversing objects in a file system. The method may include traversing a portion of the file system to identify an object to be read and to determine a size representative of the object and determining whether to represent the object in a data structure based at least in part on one or more factors including the size representative of the object and a cumulative size of objects currently represented in the data structure. The method may also include prefetching at least a portion of the objects currently represented in the data structure.

Another embodiment of the present invention includes a computer-readable medium on which are stored executable instructions that, when executed by a processor, cause the processor to perform a method for traversing objects in a file system. The method may comprise traversing a portion of the file system to identify an object to be read and to determine a size representative of the object. The method may also comprise determining whether to represent the object in a data structure based at least in part on one or more factors including the size representative of the object and a cumulative size of objects currently represented in the data structure. The method may further include prefetching at least a portion of the objects currently represented in the data structure.

A further embodiment of the present invention includes a system for managing reading of a portion of a file system. The system may comprise a storage device capable of accessing a file system, a memory operably coupled to the storage device, and a processing module operably coupled to the memory and the storage device. The processing module may comprise a prefetch module, a working module, and a data structure capable of representing files in the file system. The prefetch module may be configured to traverse data related to a portion of the file system and to represent a file in the data structure based at least in part on a size of the file and a cumulative size of files currently represented in the data structure. The prefetch module may be further configured to open the file and to prefetch at least a portion of the file. The working module may be configured to read the files represented in the data structure so as to transfer the files from the storage device to the memory.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Figure 1:
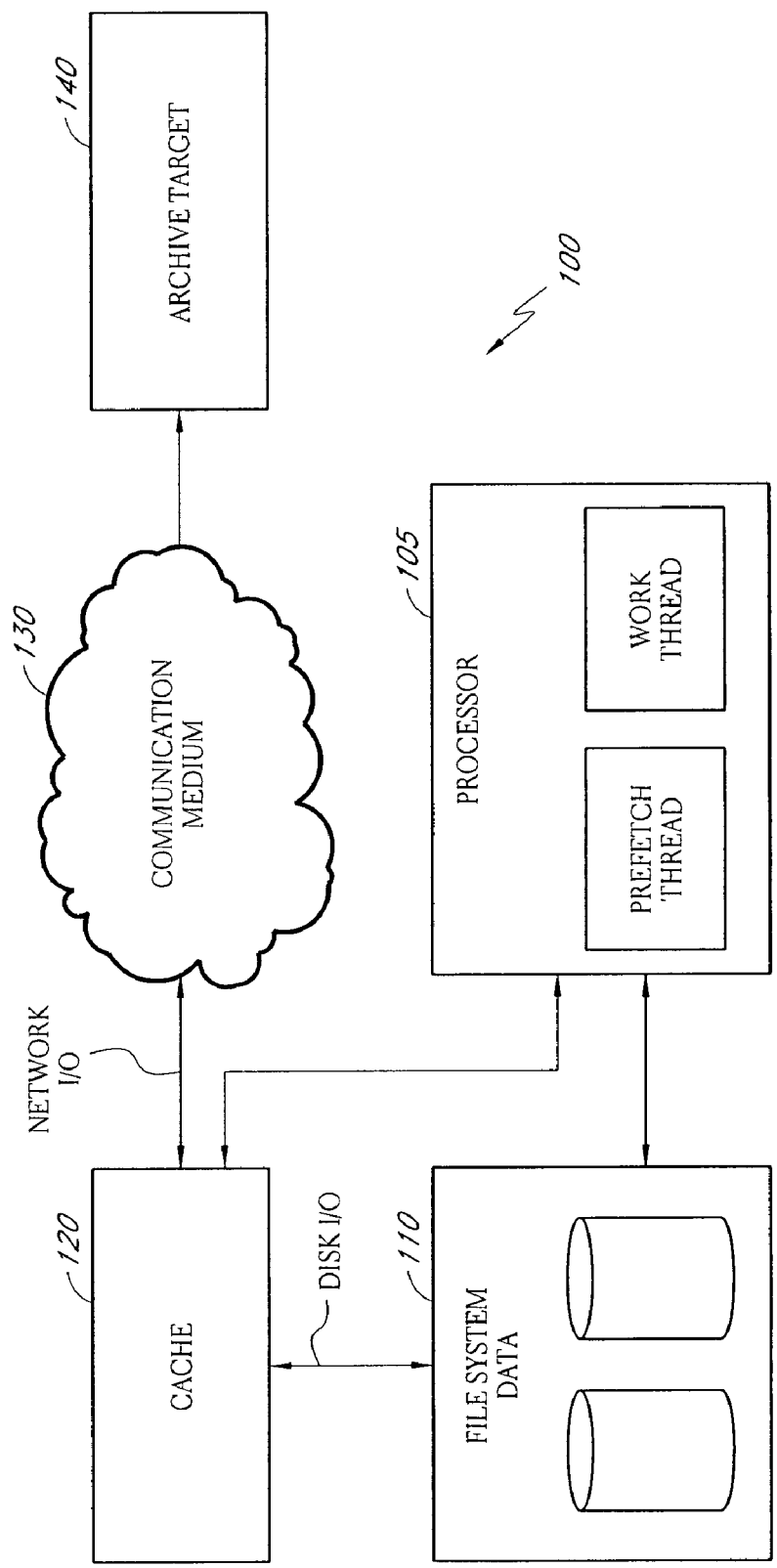
FIG. 1 illustrates an embodiment of a backup system.

These and other features will now be described with reference to the drawings summarized above. The drawings and the associated descriptions are provided to illustrate embodiments of the invention and not to limit the scope of the invention. Throughout the drawings, reference numbers may be reused to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in the context of a file system, which may be a distributed file system. The present invention is not limited by the type of environment in which the systems and methods are used, however, and systems and methods may be used in other environments, such as, for example, other file systems, other distributed systems, the Internet, the World Wide Web, a private network for a hospital, a broadcast network for a government agency, and an internal network for a corporate enterprise, an Intranet, a local area network, a wide area network, a wired network, a wireless network, and so forth. Some of the figures and descriptions, however, relate to an embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims and their equivalents.

One example of a distributed file system, in which embodiments of systems and methods described herein may be implemented, is described in U.S. patent application Ser. No. 10/007,003 entitled "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001, which claims priority to Application No. 60/309,803 filed Aug. 3, 2001, U.S. Pat. No. 7,146,524 entitled "SYSTEMS AND METHODS FOR PROVIDING A DISTRIBUTED FILE SYSTEM INCORPORATING A VIRTUAL HOT SPARE," filed Oct. 25, 2002, and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated by reference herein in their entirety.

For purposes of illustration, some embodiments will also be described with reference to updating data structures in a file system using information stored in related data structures of the file system. Embodiments of a file system capable of updating data structures with information stored in related data structures of a file system are disclosed in U.S. patent application Ser. No. 11/255,337, titled, "SYSTEMS AND METHODS FOR ACCESSING AND UPDATING DISTRIBUTED DATA," and is hereby incorporated by reference in its entirety.

For purposes of illustration, certain embodiments of the systems and methods disclosed herein will be described in the example context of backing up a file system to a storage medium. The scope of the disclosure is not limited to file system backups, and in other embodiments, the systems and methods advantageously may be used, for example, for replicating a disk, indexing and/or searching file systems and/or data on a search engine, generating a cryptographic hash function (for example, an md5sum), and so forth. The specific examples described below are set forth to illustrate, and not to limit, various aspects of the disclosure.

I. Overview

FIG. 1 schematically illustrates an embodiment of a backup system 100 that may be used to copy ("backup") file system data stored on a storage device 110 to an archive target 140. In some embodiments, the storage device 110 may include one or more physical disks. In other embodiments, the storage device 110 may include a magnetic storage medium, an optical disk, a random access memory (RAM), a hard-disk drive, cache memory, solid state storage, and/or other storage media. The archive target 140 may be used to store the backup copy of the file system data. In some embodiments, the archive target 140 includes a magnetic tape drive. In other embodiments, the archive target 140 may include another storage device similar to the storage device 110. In another embodiment, the archive target 140 includes an optical disk, a hard-disk drive, solid state storage, RAM, cache, and/or other storage media. Although FIG. 1 illustrates a single storage device 110, in other embodiments an array of one or more types of storage devices may be used to store the file system data. Similarly, the archive target 140 may include an array of one or more types of data storage devices.

In some embodiments, a distributed file system is used to store the file system data. The distributed file system may comprise one or more physical nodes that are configured to intercommunicate via hard-wired connections, via a suitable data network (for example, the Internet), via wireless communications, or by any suitable type of communication as known by those of ordinary skill in the art. In one example, a node of the distributed file system comprises the storage device 110. The archive target 140 may comprise data storage on the same node or on a different node of the distributed file system or may comprise another storage device as discussed above (for example, a tape drive).

In some embodiments, the backup system 100 is configured to transfer a copy of the file system data to a cache 120 before transferring the cached data through a communication medium 130 to the archive target 140. The cache 120 thereby buffers the data waiting to be transferred to the archive target 140 via the communication medium 130. In some embodiments, the cache 120 comprises volatile and/or non-volatile memory with fast data access times. For example, in one embodiment, 1 G RAM cache is used. The communication medium 130 may comprise a wired or wireless communication medium. In some embodiments, the communication medium 130 comprises a data network such as a wide-area network or local-area network, the Internet, or the World-Wide-Web. The communication medium 130 may support communications protocols such as TCP/IP, backup protocols such as NDMP, and/or standards for file access such as NFS or CIFS.

In some backup system embodiments, file system data is read from the storage device 110 to the cache 120 and then the cached data is transferred to the archive target 140. The input/output (I/O) performance of the cache 120 typically is much better than the I/O performance of the storage device 110 (for example, "disk I/O" in FIG. 1) and/or the communication medium (for example, "network I/O" in FIG. 1). Accordingly, in such embodiments, because the disk I/O and the network I/O are performed serially, the overall performance of the backup system 100 typically is limited by the lesser of the disk I/O or the network I/O. Additionally, if the file system data includes numerous files that are small in size, the backup performance may be further reduced if the communication medium 130 has to wait for each of the small files to be read from the storage device 110 (for example, the communication medium 130 may be latency bound).

Accordingly, some embodiments of the backup system 100 advantageously may "read ahead" or "prefetch" portions of the file system data before this data is requested by the target archive stream. The file system data may include file data and/or metadata. The prefetched data may be stored on the cache 120 ("cached") so that it is available when needed for transfer by the communication medium 130 to the archive target 140. Although caching prefetched file system data consumes storage in the cache 120, the caching may improve the performance of the backup system 100 by reducing latency in the disk I/O. Additionally, in certain embodiments, portions of data in each file in a group of files may be prefetched by the backup system 100. The size of the data portions and/or the number of files in the group may be selected so that the network I/O stream does not stall or become latency bound. Such embodiments of the system 100 advantageously may improve the backup performance particularly when the file system includes numerous small files. Further, in certain embodiments, multiple processing threads handle the data and file prefetch and the data transfer to the archive target 140. An advantage of such embodiments is that the prefetch and the data transfer may perform in parallel, rather than in a serial fashion.

In order to more efficiently utilize cache resources, embodiments of the backup system 100 may optionally implement a "drop behind" procedure in which data (for example, file data and/or metadata) is dropped from the cache 120 after the data has been transferred to the archive target 140. Such embodiments advantageously improve cache utilization and reduce the impact of the prefetch process on other processing threads that also may be attempting to store data in the cache 120.

In the backup system 100 illustrated in FIG. 1, a processor 105 may be configured to execute one or more program modules that carry out embodiments of the methods described herein. The word module refers to logic embodied in hardware or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In some embodiments, the processor 105 is remote from the storage device 110, cache 120, and/or the archive target 140. In other embodiments, the processor 105 (or processors) may be included in one or more of the components of the backup system 100. For example, a node of a distributed file system may comprise the processor 105, the storage device 110, and the cache 120. Multiple processors are used in certain embodiments.

The processor 105 may be a general purpose computer using one or more microprocessors, such as, for example, a Pentium processor, a Pentium II processor, a Pentium Pro processor, a Pentium IV processor, an x86 processor, an 8051 processor, a MIPS processor, a Power PC processor, a SPARC processor, an Alpha processor, and so forth. In other embodiments, the processor 105 may be a special purpose computer comprising one or more integrated circuits such as application-specific integrated circuits (ASICs), field-programmable gate arrays (FPGAs), and so forth.

The backup system 100 may be configured to operate with a variety of one or more operating systems that perform standard operating system functions such as accessing, opening, reading, writing, and closing a file. It is recognized that other operating systems may be used, such as, for example, Microsoft® Windows® 3. X, Microsoft® Windows® 98, Microsoft® Windows® 2000, Microsoft® Windows® NT, Microsoft® Windows® Vista®, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

II. Example File System

In general, various embodiments of the disclosed systems and methods relate to reading objects in a file system. In some embodiments, the objects may include files and/or directories. As used herein, a file is a collection of data stored in one unit under a filename. A directory, similar to a file, is a collection of data stored in one unit under a directory name. A directory, however, is a specialized collection of data regarding elements in a file system. In one embodiment, a file system is organized in a tree-like structure. Directories are organized like the branches of trees. Directories may begin with a root directory and/or may include other branching directories (for example, subdirectories). Files resemble the leaves or the fruit of the tree. Files, typically, do not include other elements in the file system, such as files and directories. In other words, files do not typically branch.

In some embodiments of a file system, metadata structures, also referred to as inodes, are used to monitor and manipulate the files and directories within the file system. An inode is a data structure that describes a file or directory and may be stored in a variety of locations including in the storage device 110, other storage devices, and/or in memory. In some embodiments, each inode points to one or more locations on a physical disk that store the data associated with a file or directory. The inode in-memory may include a copy of the on-disk data plus additional data used by the system, including fields associated with the data structure. Although in certain illustrated embodiments an inode represents either a file or a directory, in other embodiments, an inode may include metadata for other elements in a distributed file system, in other distributed systems, in other file systems, or in other systems.

In embodiments described herein, data in the file system may be organized into data blocks. Conceptually, a data block may be any size of data, such as a single bit, a byte, a gigabyte, or even larger. In general, a data block is the smallest logical unit of data storage in the file system. In some embodiments, a file system may use data block sizes that are different from the native block size of a physical disk. For example, a physical disk may have a native size of 512 bytes, but a file system may address 4096 bytes or 8192 bytes.

Figure 2:
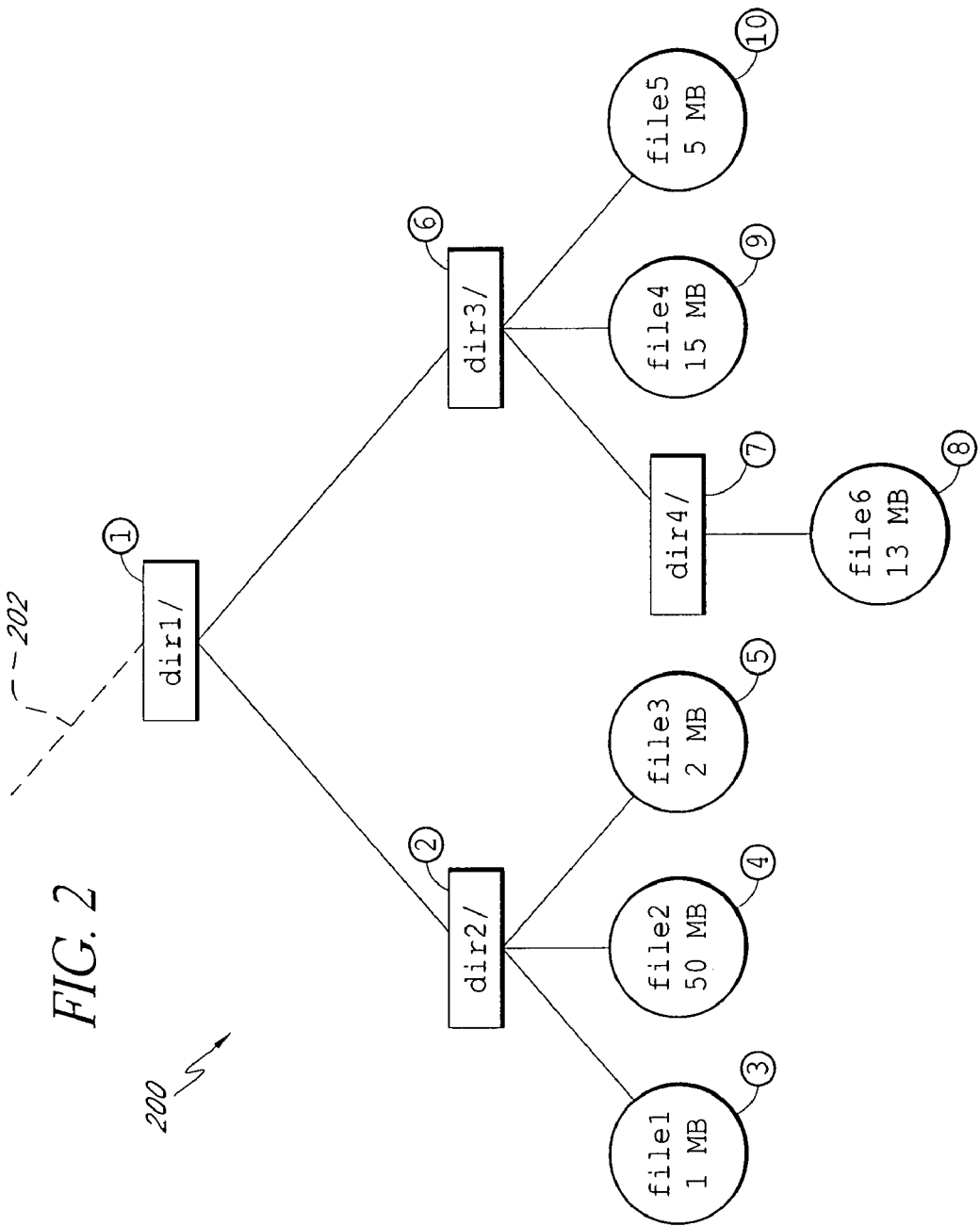
FIG. 2 illustrates an embodiment of a portion of a file system.

FIG. 2 schematically illustrates an embodiment of an example of a portion of a file system 200 that includes data stored on the storage device 110 illustrated in FIG. 1. In FIG. 2, directories are represented by rectangles (for example, "dir1/"), and files are represented by circles (for example, "file1"). The circles representing the files also include an example physical size of the file in megabytes (for example, the size of file1 is 1 MB). The individual files and directories shown in FIG. 2 are associated with an index, which is depicted as a numeral in a small circle. For example, dir1/ is associated with the index 1, file1 is associated with the index 3, and so forth. The indexing shown in FIG. 2 is not intended to be a limitation on the systems and methods disclosed herein and is simply for convenience of presentation only. In the example shown in FIG. 2, the index is selected to represent the order in which the files and directories in the file system tree would be traversed or searched in a depth-first search starting at dir1/. However, any other suitable indexing system could be used. In FIG. 2, lines connecting the files and/or directories represent branches of the file system tree. In this example tree, the directory dir1/ is a child node of a parent directory node, which is not shown but is indicated by dashed line 202. However, this is not a limitation, and in other cases the directory dir1/ may be the root of the file system 200.

In other embodiments, the portion of the file system 200 may have a different number of files and/or directories than is shown in FIG. 2. Additionally, the example file sizes may be different in other embodiments. In some cases, the portion of the file system 200 may include the entire file system for a computer system (for example, the directory dir1/ may be the root directory). In some cases, the portion of the file system 200 may include files and directories having, for example, particular permissions or access rights (for example, user and/or group IDs). Many variations in the file system are possible.

III. Example Backup Systems and Methods

As described above, certain embodiments of the backup system may utilize multiple processing threads in order to at least partially parallelize prefetching file system data from the storage device 110 and transferring the data to the archive target 140 via the communication medium 130. One possible advantage of such embodiments is that performance of the backup process may be improved, particularly when the file system includes many small files and/or when disk I/O performance is less than network I/O performance (see, for example, FIG. 1).

In certain embodiments, two separate processing threads are utilized by the system: a "prefetch thread" and a "work thread." In certain such embodiments, the prefetch thread and/or the work thread may be executed by the processor 105 shown in FIG. 1. In brief, the prefetch thread traverses the portion of the file system being backed up and prefetches data (for example, file data and/or metadata) associated with objects in the file system (for example, files and directories). The prefetched data may be stored in the cache 120. The work thread transfers the prefetched data to the archive target 140 via the communication medium 130. In some embodiments, the prefetch thread represents file system objects that are to be prefetched and stored in a data structure such as, for example, a queue. The work thread is a consumer of the data in the data structure. When the work thread accesses an object represented in the data structure, the prefetch thread advantageously has already prefetched at least a portion of the data for the object.

In some embodiments, the prefetch thread sleeps when the amount of prefetched data exceeds a first threshold referred to as a "high water mark" (HWM). As the work thread transfers the prefetched data, the amount of untransferred, cached data decreases. In some embodiments, the prefetch thread wakes when the amount of untransferred, cached data decreases below a second threshold referred to as a "low water mark" (LWM). The high water mark and/or the low water mark may be selected, for example, so that the prefetch thread uses a reasonable amount of memory in the cache 120 for storing the prefetched data, and/or so that the work thread does not stall while waiting for data to transfer. In some embodiments, a drop-behind procedure is used to drop data from the cache 120 after the file system object has been transferred to the archive target 140.

Although certain embodiments of the backup system use two processing threads, other embodiments may use a different number of threads including one, three, four, six, fifteen, or more threads. Also, other embodiments of the backup system may combine or allocate differently some or all of the functions performed by the prefetch thread and the work thread. Additional details of these and other embodiments will be further described below.

A. Example Backup Processes

Figure 3:
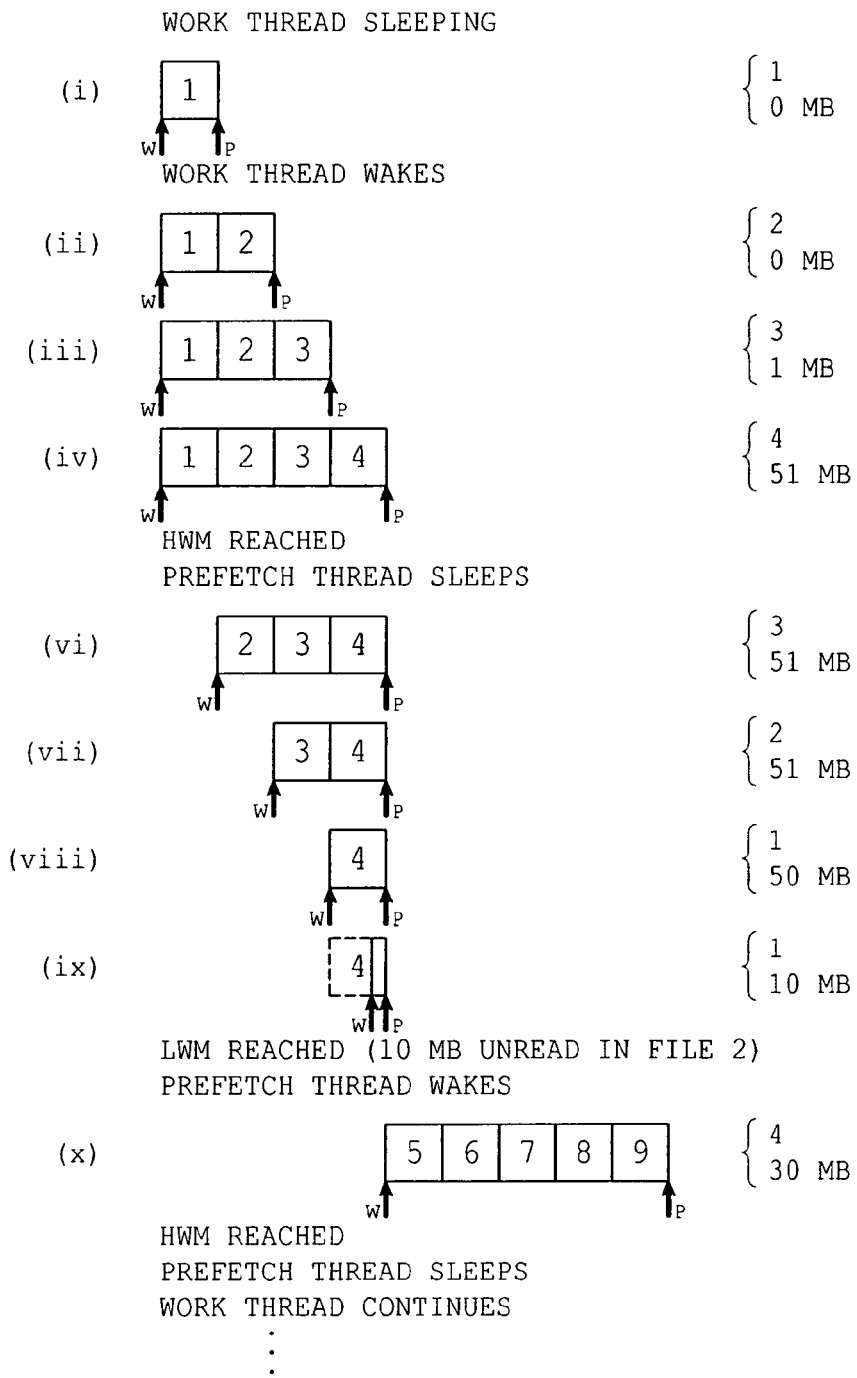
FIG. 3 schematically illustrates an embodiment of a backup system that uses a prefetch thread and a work thread to backup the example file system shown in FIG. 2.

FIG. 3 schematically illustrates an embodiment of a backup system that uses a prefetch thread and a work thread to backup objects in the example file system shown in FIG. 2. The objects include the file and directory data and/or metadata in the files and directories shown in FIG. 2. In this example, the prefetch thread uses a queue to represent objects in the file system that are to be prefetched. In other embodiments, data structures other than a queue may be used such as, for example, a stack, a heap, a list, and so forth. FIG. 3 schematically illustrates, from top to bottom, the state of the queue and the prefetch and work threads at various points in the backup process. The file system objects represented in the queue are depicted with squares, and a number inside the square corresponds to the numerical index shown in FIG. 2 for that object. For example, in state (i), the queue includes one file system object having the index 1, which from FIG. 2 is seen to correspond to dir1/. For each of the states shown in FIG. 3, vertical pointers referenced by the letters "W" and "P" are used to schematically represent the progress of the work thread and prefetch thread, respectively.

In the example shown in FIG. 3, the backup system uses a high water mark (HWM) and a low water mark (LWM) to control the cumulative size of the file system objects represented in the queue. In this embodiment, if the cumulative size of the file system objects represented in the queue exceeds the HWM, a sufficient amount of file system objects have been represented in the queue, and the prefetch thread sleeps. If the cumulative size of the file system objects represented in the queue falls below the LWM (for example, due to operation of the work thread), the prefetch thread wakes and begins to prefetch additional objects. The cumulative size of the queue may be based on one or more metrics including, for example, cumulative physical size of the data (and/or metadata) of the objects represented in the queue, cumulative number of objects represented in the queue, or any other suitable measure of the size of the queue. In some embodiments, the HWM and LWM include more than one of these factors. For example, in the embodiment shown in FIG. 3, the high and low water marks include values for both the cumulative physical size of the objects (in megabytes) and cumulative number of objects. Embodiments using both cumulative physical size and cumulative number of objects may have several advantages. For example, if the file system includes numerous small files, then many files will be represented in the queue, which reduces the likelihood the file transfer to the archive target 140 will stall or become latency bound. If the file system includes files having large sizes, then relatively few files will be represented in the queue, but the cumulative size of these files will be sufficiently large to reduce the latency of the transfer.

In certain embodiments, the HWM and/or the LWM can be adjusted by a user, for example, to tune the system so that the backup process uses a reasonable amount of system resources (for example, cache) and/or has a sufficiently low latency. In certain such embodiments, the HWM and/or the LWM may be dynamically adjustable based on, for example, current CPU and memory usage, transfer speed of the communication medium 130, transfer speed of the storage device 110, and so forth. In some embodiments, default values for the LWM may include 10 MB for the physical size of the data and/or 1000 for the number of files. Default values for the HWM may include 20 MB for the physical size of the data and/or 2000 for the number of files.

The prefetch thread traverses a portion of the file system to identify an object to be prefetched. In the example illustrated in FIGS. 2 and 3, the prefetch thread uses a depth-first method to traverse the portion of the file system 200 that is to be backed up. In other embodiments, other file system traversal methods may be used such as, for example, a breadth-first search. In the example file system 200, in a depth-first traversal the prefetch thread begins at dir1/ and continues through the file system tree in the order indicated by the circled numerical indices.

During the traversal, the prefetch thread determines a size that is representative of the object (for example, file or directory data and/or metadata). As discussed above, the size may represent the physical size of the data and/or metadata associated with the object on the storage device 110. Because the physical size of a directory's metadata generally is relatively small compared to files, physical sizes of directories are not taken into account in some embodiments. In other embodiments, the size may represent a numerical count associated with the object. In the example shown in FIG. 3, a file and a directory are each assigned a numerical count of one. In other embodiments, the numerical count may be weighted to reflect the size, or other properties, of the object. In some embodiments, including the embodiment shown in FIG. 3, both physical size and a numerical count are determined by the prefetch thread. In other embodiments, different measures of the size of a file system object may be used.

The prefetch thread determines whether to represent the object in the queue based at least in part on one or more factors including the size determined to be representative of the object and a cumulative size of objects currently represented in the queue. For example, if the cumulative size is less than a threshold (for example, the HWM), the prefetch thread represents the object in the queue. If the cumulative size of the queue exceeds the threshold, the prefetch thread does not add the object to the queue. In the example shown in FIG. 3, the physical size of a directory's metadata is taken to be zero bytes, and the physical size of a particular file is the file size shown in FIG. 2. For each state of the backup process, the cumulative size of objects currently represented in the queue (including both number of objects and physical size) is shown on the right side of FIG. 3. The HWM and the LWM are indicated at the top of FIG. 3. In this example, the HWM includes the values: 2000 objects and 20 MB, and the LWM includes the values: 1000 objects and 10 MB.

Various states of the queue and the prefetch and work threads will now be described with reference to FIG. 3 and the portion of the file system 200 shown in FIG. 2. In state (i), the work thread initially is asleep. The prefetch thread begins to traverse the file system, starting at the root dir1/ of the portion of the file system 200 that is to be backed up. Because the queue initially is empty, the prefetch thread adds a representation of dir1/ (index 1 in FIG. 3) to the queue. To indicate that the prefetch thread has added dir1/ to the queue, the prefetch pointer is shown in FIG. 3 at the end of the queue. Because the queue is now non-empty, the work thread wakes, and begins to transfer to the target archive 140 data and/or The prefetch thread continues to traverse the file system and identifies the next object, which in a depth-first traversal is dir2/. The current size of the queue {1 object, 0 MB} is below the HWM, so in state (ii), the prefetch thread adds a representation of dir2/ (index 2 in FIG. 3) to the queue. Continuing in state (iii), the next object identified in the traversal of the file system 200 is file1 (index 3 in FIG. 3), which is represented in the queue, because the cumulative size of the queue is below the HWM. Similarly, in state (iv), the prefetch thread represents file3 (index 4 in FIG. 3) in the queue, because the cumulative queue size is below the HWM. As can be seen in states (i)-(iv) shown in FIG. 3, the prefetch pointer moves to the right to represent the growth of the queue.

After the prefetch thread represents a particular object in the queue, the prefetch thread may prefetch at least a portion of the data and/or metadata associated with the object. The prefetch thread may prefetch locks, inodes, data blocks, and so forth. The prefetch thread may store the prefetched data and/or metadata in the cache 120 or in any other suitable memory. In some embodiments, the prefetch thread may not prefetch all the data (for example, file data and/or metadata) associated with the object. For example, the prefetch thread may prefetch only the data blocks at the beginning of the object (for example, the first 512 kB).

In state (iv), after the representation of file2 (index 4 in FIG. 3) in the queue, the cumulative size of files and directories represented in the queue is 4 objects and 51 MB. In this example, although the HWM for number of objects has not been exceeded, the HWM for physical size has been exceeded. In certain embodiments, the prefetch thread sleeps when any of the various HWM values is exceeded, because a sufficient amount of objects (for example, number and/or physical size) has been represented in the queue.

Returning to state (i), after dir1/ has been represented in the queue, the queue is non-empty, and the work thread wakes and begins transferring the prefetched data to the archive target 140. In embodiments in which the prefetch thread did not prefetch all the data associated with the object, the work thread may issue routine operating system prefetch or read-ahead calls for the data blocks that were not prefetched by the prefetch thread. As shown in states (vi)-(ix), the work thread pointer moves to the right to indicate that objects in the queue have been consumed (for example, transferred to the target archive 140). As the work thread consumes the queue, the work thread may update the cumulative size of the objects currently represented in the queue. In some embodiments, the work thread updates the cumulative size whenever a certain amount of data has been transferred. In one embodiment, the update is performed each time 512 kB of data is transferred by the work thread. As can be seen in the example in FIG. 3, the cumulative size of objects represented in the queue decreases from state (vi) to state (ix) as the work thread consumes the queue.

The file2 (index 4 in FIG. 3) is the last object in the queue, because the HWM was reached in state (iv) and the prefetch thread went to sleep. In the state (ix), the work thread has previously transferred the data and/or metadata associated with all the other objects in the queue, and is currently transferring the data and/or metadata associated with file2. At the point shown for state (ix) in FIG. 3, the data and/or metadata of file2 that has already been transferred is schematically illustrated by the dashed line portion of the square representing file2, and the portion of file2 remaining to be transferred is schematically illustrated by the solid line portion of the square. Further details related to the transfer of the data in file2 will be described below with reference to FIG. 4.

As file2 is consumed by the work thread, the cumulative size of the untransferred portion of the queue decreases. To reduce the likelihood that the queue will be entirely consumed by the work thread, in certain embodiments, the work thread wakes the prefetch thread when the cumulative size of the untransferred objects represented in the queue decreases below the LWM threshold. The prefetch thread begins again to traverse the file system, starting from the place in the file system at which the prefetch thread last went to sleep. In some embodiments, a token such as a cookie is used to indicate the place in the file system where the traversal is to start. In a similar fashion as described above, the prefetch thread continues to traverse the file system and to represent objects in the queue until, for example, the HWM is reached (or all of the data being transferred has been transferred).

In FIG. 3, the LWM is reached in state (ix), when 10 MB of file2 remain to be transferred, and the work thread wakes the prefetch thread. By the point illustrated in state (x), the prefetch thread has represented in the queue file3 (index 5), dir3/(index 6), dir4/ (index 7), file6 (index 8), and file4 (index 9). The physical size of the objects represented in the queue is 30 MB, which exceeds the HWM, so the prefetch thread again sleeps, while the work thread continues to consume the queue. This process of building and consuming the queue may be repeated, as needed, until the entire portion of the file system 200 is transferred to the archive target 140.

Figure 4:
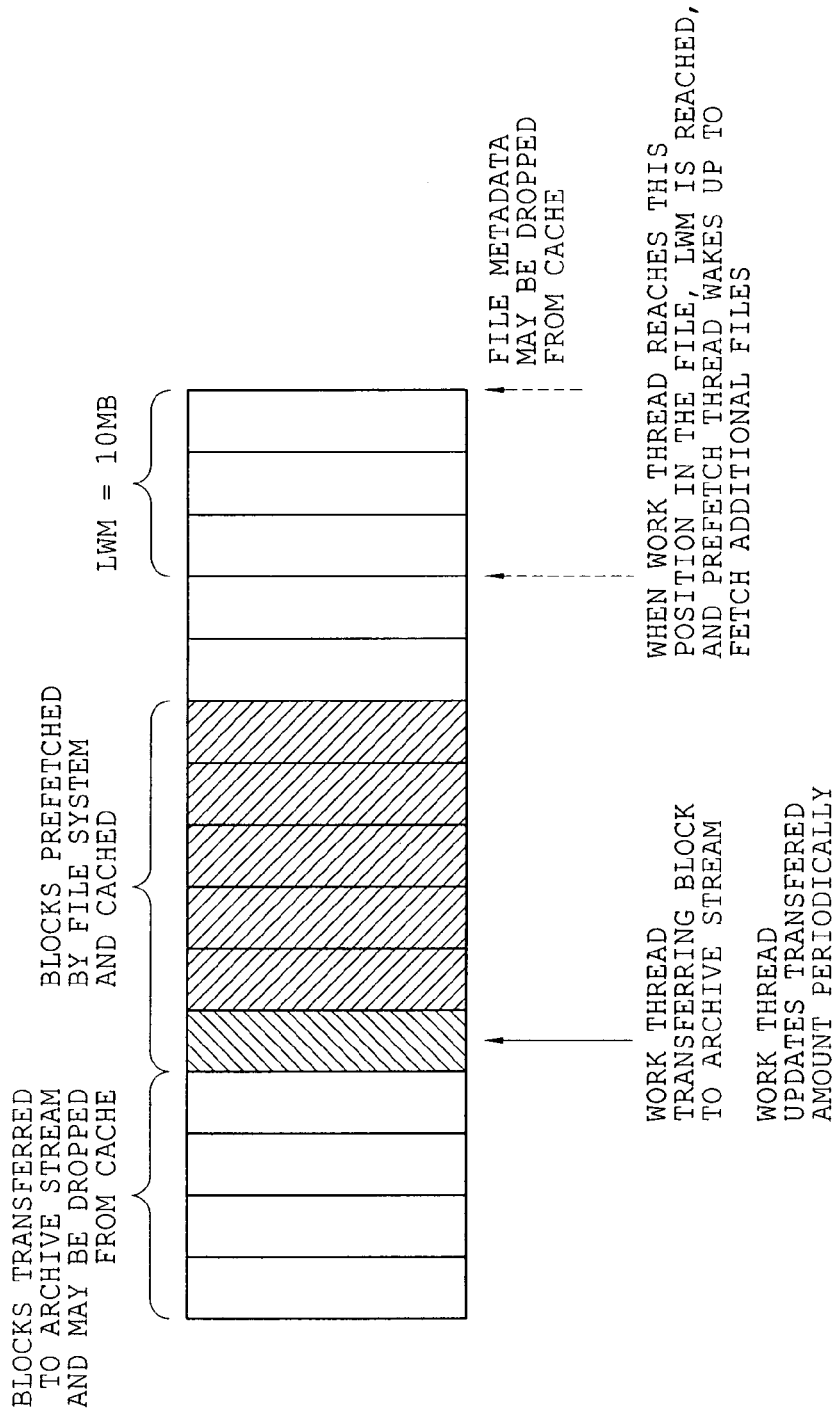
FIG. 4 schematically illustrates an embodiment of the prefetch thread and the work thread processing file2 of the file system shown in FIG. 2.

FIG. 4 schematically illustrates in greater detail an embodiment of state (ix) shown in FIG. 3. In state (ix), the prefetch thread and the work thread are processing file2 of the file system 200 shown in FIG. 2. The physical size of file2 is 50 MB, and for future reference, the LWM is 10 MB. As schematically illustrated in FIG. 4, the work thread transfers cached data blocks (shaded) from file2 to an archive stream for communication to the archive target 140. These data blocks may have been prefetched and cached by the prefetch thread before the work thread began processing file2. As described above, in some embodiments, the prefetch thread prefetches only the data (for example, file data and/or metadata) blocks at the beginning of the file. In such embodiments, some or all of the cached data blocks may have been prefetched by the work thread using standard operating system read-ahead calls.

In this example, when the work thread reaches a point in file2 where 10 MB remain to be transferred, the amount of untransferred data represented in the queue reaches the LWM. In some embodiments, as described above with reference to step (x) of FIG. 3, the work thread wakes the prefetch thread, which starts again to traverse the file system and represent additional files and directories in the queue.

In some embodiments, the backup system utilizes a dropbehind procedure in which some or all of the data (and/or metadata) blocks that have been transferred to the archive stream are dropped from the cache. These embodiments advantageously allow the freed memory to be used to store additional data prefetched by the prefetch thread or to be used by other processing threads. In the example shown in FIG. 4, the data blocks (unshaded) at the beginning of the file have been dropped from the cache. In certain embodiments, metadata (for example, inodes) are not dropped from the cache until all the data blocks of the file have been transferred.

B. Example Methods for Traversing and Using Objects in a File System

Although certain embodiments described herein relate to backing up objects in a file system to a target archive (for example, a tape drive), other embodiments of the systems and methods may advantageously be used for replicating a disk, indexing and/or searching file systems, generating a cryptographic hash, and so forth.

Figure 5:
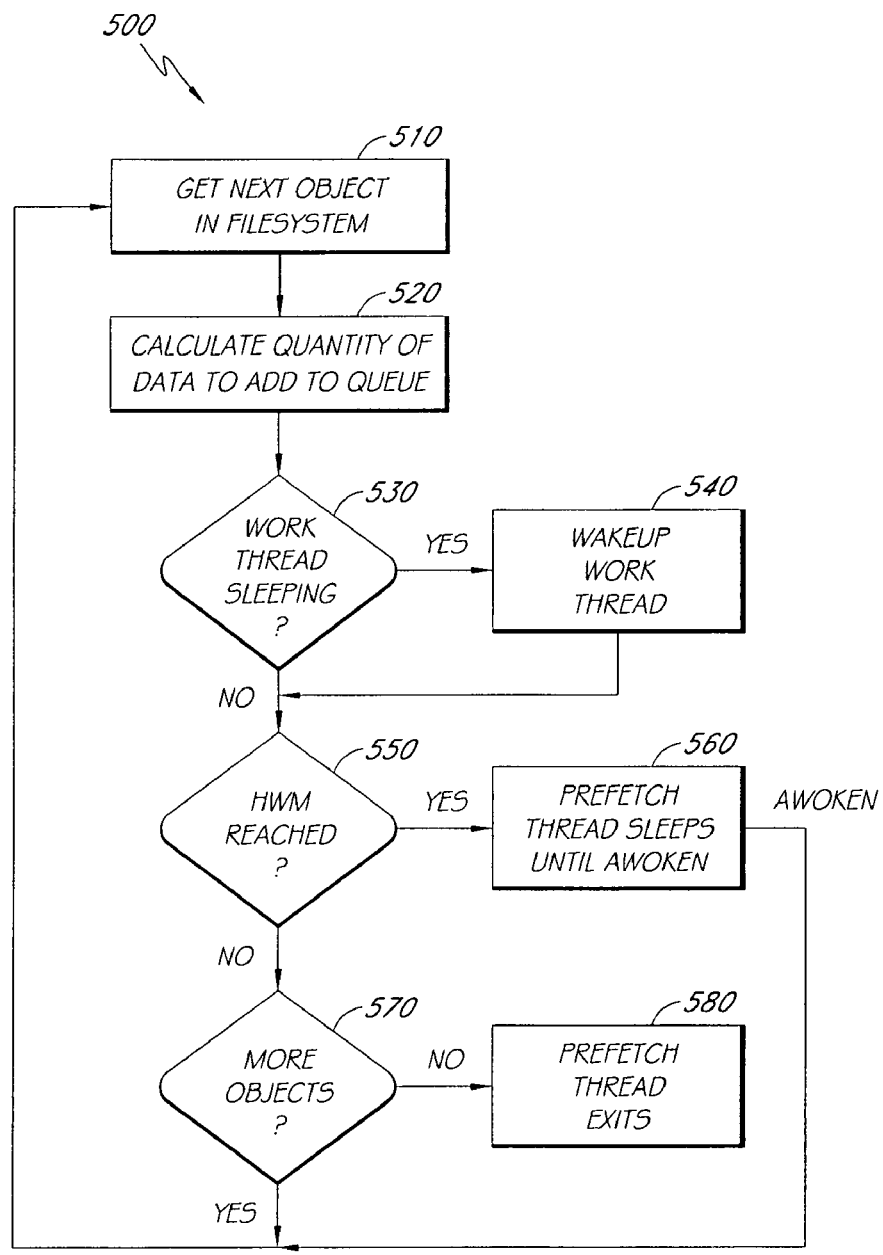
FIG. 5 is a flow chart that illustrates an embodiment of a method for a prefetch thread to prefetch objects from a file system.

FIG. 5 is a flow chart that illustrates an embodiment of a method 500 for a prefetch thread that is configured to prefetch objects from a portion of a file system. The prefetch thread may be used with a work thread, which will be described in further detail with respect to FIG. 6. In some embodiments, the portion of the file system includes the entire file system. In other embodiments, the portion of the file system includes a snapshot of some or all of the data stored on the file system. Systems and methods for snapshots of data are further described in, for example, U.S. patent application Ser. Nos. 11/506,596, 11/506,610, 11/506,591, and 11/507,069, each of which was filed Aug. 18, 2006, and entitled, "SYSTEMS AND METHODS FOR A SNAPSHOT OF DATA," and each of which is hereby incorporated by reference herein in its entirety.

In state 510, the prefetch thread traverses the file system and gets the next object in a portion of the file system. The portion may include the entire file system. The prefetch thread may use any suitable traversal method such as, for example, a depth-first traversal. The objects in the file system may include files and/or directories. In state 520, the prefetch thread calculates the quantity of data to represent in a data structure such as, for example, a queue. In some embodiments, the prefetch thread determines a size for the object, and a cumulative size for objects currently represented the data structure. If the cumulative size is below one or more thresholds, which may be, for example, the high water mark (HWM) described above, the prefetch thread represents the object in the data structure. The cumulative size represented by the data structure may be updated to reflect addition of the object. In certain embodiments, the update is performed by the work thread (see, for example, state 640 in FIG. 6). In some embodiments, the prefetch thread may prefetch a portion of the file data and/or metadata associated with the objects represented in the data structure. The prefetched data and/or metadata advantageously may be stored in a memory with fact access times such as, for example, a cache.

In state 530, the prefetch thread determines whether the work thread is sleeping. If the work thread is asleep, in state 540 the prefetch thread wakes the work thread to begin using the objects represented in the data structure. If the work thread is not asleep, the prefetch thread determines in state 550 whether the cumulative size of the objects represented in the data structure has reached the HWM. If the cumulative size equals or exceeds the HWM, the prefetch thread sleeps (state 560) until awoken by the work thread (see, for example, state 660 in FIG. 6). When awoken, the prefetch thread returns to state 510 and gets the next object in the file system. If the cumulative size represented in the data structure is below the HWM, the prefetch thread continues in state 570 and determines if there are additional objects in the portion of the file system being traversed. If there are no more objects, the prefetch thread exits in state 580. If there are more objects, the prefetch thread returns to state 510 and gets the next object.

The following is an example of pseudocode for an embodiment of a prefetch thread. It will be appreciated by one of ordinary skill in the art that there are many ways to implement a prefetch thread.

```
prefetch_process( ) {
    /*
     * process directories
     */
    while (dir or dir popup dir_stack)
        if (dir excluded or dir skipped)
            continue;
        /*
         * determine size of objects to represent in a work queue
         */
        size_to_read(&size);
        /*
         * traverse file system and return an array (dirents)
         * of file and directory names that match the requested size
         */
        readdirplus(dir->dir_fd, flags, size, dirents, stats,
        &entries_read);
        if (entries_read is 0)
            continue;
        for (each dirent d)
            if (d excluded)
                continue;
            /*
             * enqueue directories in the work queue for post-order visit
             * to achieve hybrid depth first traversal
             */
            if (d is directory)
                enqueue(work_queue, d);
                may wakeup work thread;
                if (dir) {
                    push(dir_stack, dir);
                    dir = NULL;
                }
                push(dir_stack, d);
            else
            /*
             * prefetch files and add to work queue
             */
                prefetch_file( );
                enqueue(work_queue, d);
                may wakeup work thread;
            /*
             * if work queue exceeds High Water Mark,
             * prefetch thread sleeps
             */
            if (work_queue above HWM)
                wait;
}
```

Figure 6:
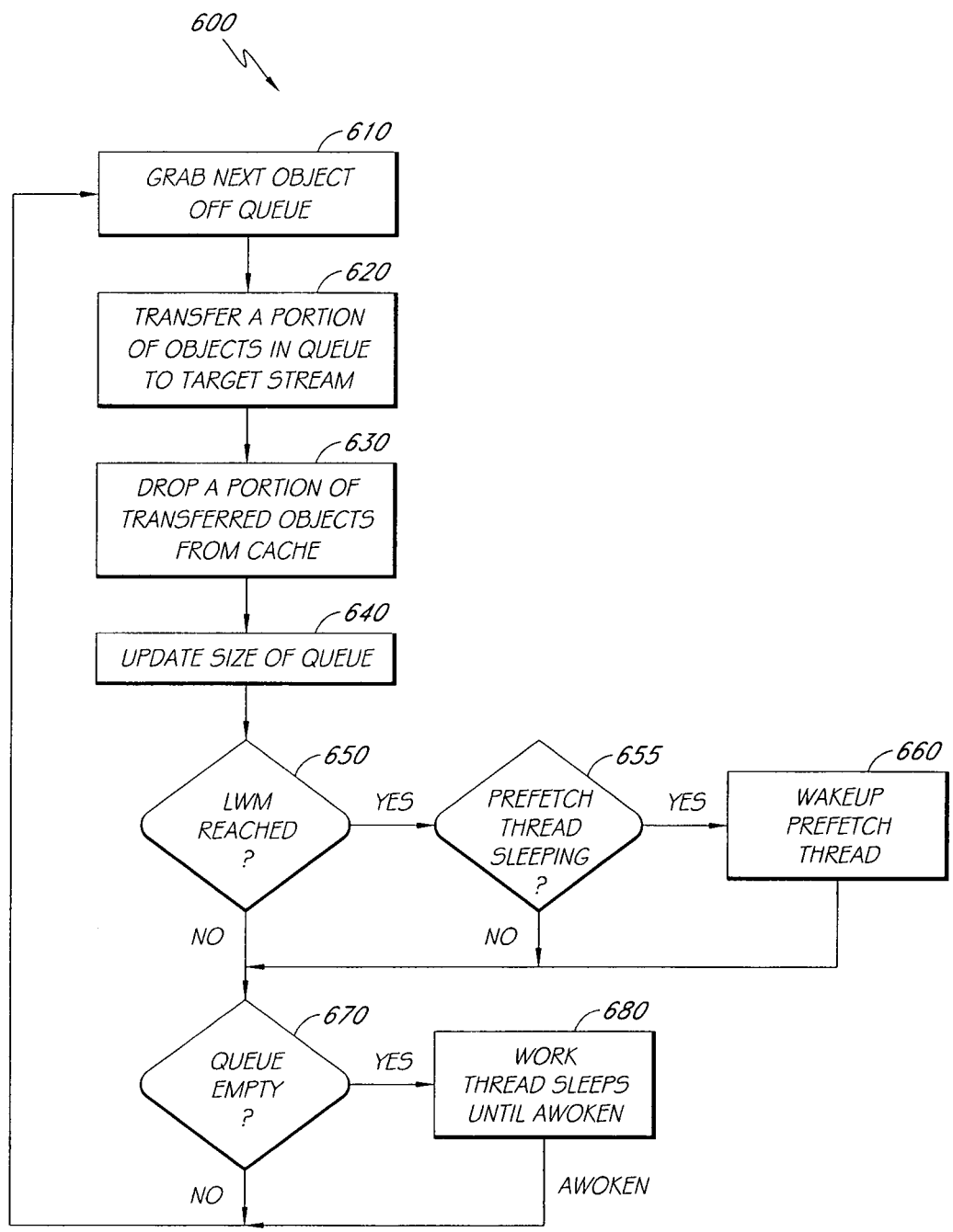
FIG. 6 is a flow chart that illustrates an embodiment of a method for a work thread to transfer objects to a target stream.

FIG. 6 is a flow chart that illustrates an embodiment of a method 600 for a work thread that is configured to use the objects that have been represented in the queue by the prefetch thread. In state 610, the work thread dequeues the next object. In block 620, the work thread transfers to a target stream some or all of the data and/or metadata associated with the object. As described above, in some embodiments the data and/or metadata have been prefetched and stored in cache by the prefetch thread. In certain backup embodiments, such as the backup system illustrated in FIG. 1, the work thread transfers the cached data to the target archive 140 via the communication medium 130. In other embodiments, the work thread uses the prefetched data for other purposes such as, for example, building a search index for the file system, compressing and/or encrypting data associated with the objects, and so forth.

Some embodiments of the work thread implement a drop-behind procedure. For example, in state 630 the work thread may drop from the cache data and/or metadata that has been transferred to the target stream. As discussed above, in some embodiments, metadata associated with an object is not dropped from the cache until all the data and metadata associated with the object has been transferred.

In state 640, the work thread updates the cumulative size of the queue. In some embodiments the cumulative size is updated based on factors including, for example, the amount of data/metadata transferred since the last update and/or the elapsed time since the last update. In state 650, the work thread determines whether the updated cumulative size of the queue has decreased below one or more thresholds, which may be, for example, the low water mark (LWM) described above. If the cumulative size is below the LWM, in state 655 the work thread determines whether the prefetch thread is sleeping. If the prefetch thread is asleep, in state 660 the work thread wakes up the prefetch thread so that the prefetch thread can continue traversing the file system to represent additional objects in the queue. If the cumulative size of the queue exceeds the LWM, in state 670 the work thread determines whether there are any remaining objects represented in the queue. If the queue is empty, in state 680 the work thread sleeps until awoken, for example, by the prefetch thread in state 540 of FIG. 5. When awoken, the work thread returns to state 610 and dequeues the next object. In state 670, if the queue is not empty, the work thread returns to state 610, and dequeues the next object.

The following is an example of pseudocode for an embodiment of a work thread. It will be appreciated by one of ordinary skill in the art that there are many ways to implement a work thread.

```
while (not done) {
    /*
     * if the work queue is below the Low Water Mark
     * then wake up the prefetch thread to prefetch more data
     */
    if (work_queue below LWM)
        wakeup prefetch thread;
    /*
     * if the work queue is empty then the work thread waits until
     * the work queue is nonempty
     */
    if (work_queue is empty)
        wait;
    /* work thread dequeues objects from the work queue for
     * use, such as transfer to an archive stream
     */
    e = dequeue(work_queue);
    use object;
}
```

IV. Other Embodiments

While certain embodiments of the invention have been described, these embodiments have been presented by way of example only, and are not intended to limit the scope of the present invention.

What is claimed is:

1. A computer system for transferring a portion of a file system to a memory, the system comprising:
   a file system stored on at least one storage device;
   one or more computer processors;
   a memory coupled to the storage device;
   a target stream;
   a data structure representing files in the file system;
   a prefetch module configured to, when executed by the one or more computer processors:
       traverse data related to a portion of the file system;
       determine whether to represent a file in the data structure based at least in part on a size of the file: a cumulative size of files currently represented in the data structure, wherein the cumulative size of the files represented in the a data structure comprises approximate cumulative space on the at least one storage device that is associated with the files, and a cumulative number of files currently represented in the data structure, wherein the prefetch module determines not to represent the file in the data structure if to do so would cause the cumulative size of files to exceed a first threshold or would cause the cumulative number of files to exceed a second threshold, wherein the first threshold and the second threshold are dynamically adjustable based on one or more of CPU usage, memory usage, transfer speed of a communication medium, and transfer speed of the at least one device; and if the determination is to add a representation of the file to the data structure, add the representation of the file, prefetch at least a portion of the file, and add the prefetched portion to the memory; and a working module configured to, when executed by the one or more computer processors, transfer at least portions of files represented in the data structure from the memory to the target stream.

2. The system of claim 1, wherein the file system comprises a distributed file system and the at least one storage device comprises a plurality of storage devices.

3. The system of claim 1, wherein the memory comprises a cache.

4. The system of claim 1, wherein the data structure comprises a queue.

5. The system of claim 1, wherein the portion of the file system comprises a directory.

6. The system of claim 1, wherein the approximate cumulative space comprises approximate cumulative space of the files represented in the data structure that have not been transferred to the target stream by the working module.

7. The system of claim 1, wherein the portion prefetched by the prefetch module comprises metadata associated with the file.

8. The system of claim 1, wherein the prefetched portion comprises data associated with the file.

9. The system of claim 8, wherein the data comprises only a beginning portion of the file.

10. The system of claim 1, wherein the prefetch module is further configured such that the traversed portion of the file system is selected to be sufficient for the cumulative size of files represented in the data structure to change by at least a predetermined amount.

11. The system of claim 1, wherein the working module is further configured to update the cumulative size of files represented in the data structure based at least in part on the size of the files transferred to the target stream.

12. The system of claim 1, wherein the numerical count is weighted to reflect properties of the represented files.

13. The system of claim 9, wherein the working module is further configured to retrieve a portion of the file which was not prefetched by the prefetch module.

* * * * *

UNITED STATES PATENT AND TRADEMARK OFFICE
CERTIFICATE OF CORRECTION

PATENT NO. : 7,966,289 B2  
APPLICATION NO. : 11/894697  
DATED : June 21, 2011  
INVENTOR(S) : Lu et al.

Page 1 of 1

It is certified that error appears in the above-identified patent and that said Letters Patent is hereby corrected as shown below:

In column 10 at line 7, change "and/or" to --and/or metadata associated with dir1/.--.

In column 14, at line 66, In Claim 1, change "the a" to --the--.

Signed and Sealed this
Thirteenth Day of December, 2011

David J. Kappos
*Director of the United States Patent and Trademark Office*